Dec. 11, 1956 H. J. KOEBER, JR 2,773,446
ENDORSING APPARATUS OR THE LIKE
Filed May 27, 1953 8 Sheets-Sheet 1

Fig.1.

Inventor:
Henry J. Koeber, Jr.
By Robert F. Michle, Atty.

Dec. 11, 1956  H. J. KOEBER, JR  2,773,446
ENDORSING APPARATUS OR THE LIKE
Filed May 27, 1953  8 Sheets-Sheet 2

Dec. 11, 1956  H. J. KOEBER, JR  2,773,446
ENDORSING APPARATUS OR THE LIKE
Filed May 27, 1953  8 Sheets-Sheet 5

Inventor:
Henry J. Koeber, Jr.
By Robert F. Miehle, Atty.

Dec. 11, 1956    H. J. KOEBER, JR    2,773,446
ENDORSING APPARATUS OR THE LIKE
Filed May 27, 1953    8 Sheets-Sheet 7

Inventor:
Henry J. Koeber, Jr.
By Robert F. Miehle, Atty.

Dec. 11, 1956  H. J. KOEBER, JR  2,773,446
ENDORSING APPARATUS OR THE LIKE
Filed May 27, 1953  8 Sheets-Sheet 8

FIG.12.

Inventor:
Henry J. Koeber, Jr.
By Robert F. Miehle, Atty.

United States Patent Office 2,773,446
Patented Dec. 11, 1956

2,773,446

ENDORSING APPARATUS OR THE LIKE

Henry J. Koeber, Jr., Norridge, Ill., assignor to Bell & Howell Company, Chicago, Ill., a corporation of Illinois Application May 27, 1953, Serial No. 357,777

8 Claims. (Cl. 101—233)

My invention relates particularly to endorsing apparatus combined with microfilm recording apparatus for endorsing documents such as bank checks as an incident of photographing the same on microfilm, although not limited to this use alone.

Objects of the invention reside in the provision of novel, efficient compact and reliable apparatus for endorsing or printing on successively fed sheets or documents, which is capable of operation at high speeds, which is particularly adapted for combination with a microfilm recorder for printing on or endorsing sheets or documents as an incident of photographing them, which is adapted for convenient detachable mounting on a certain commercial microfilm recorder, which when mounted on a microfilm recorder, has its printing and impression rollers driven from the drive motor of the recorder, which may be rendered inoperative at will, which provides an adequate controlled ink supply, and which provides for quick and convenient removal and installation of the printing and inking rollers thereof for such purposes as cleaning, replacement, or change of type matter on the printing roller.

The invention will be better understood by reference to the accompanying drawing forming a part hereof and in which.

Figure 1:
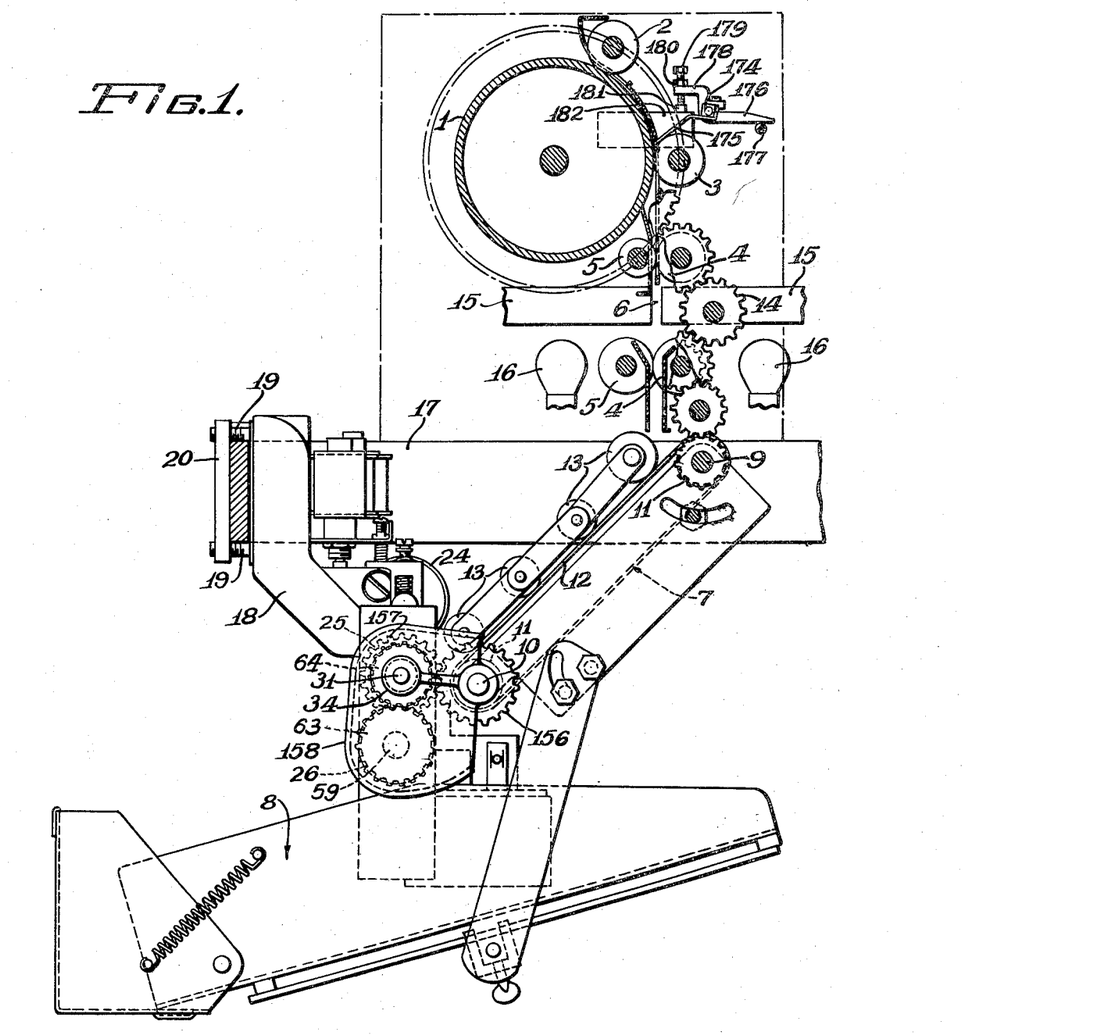
Figure 1 is a partial sectional view in side elevation of an endorsing apparatus embodying my invention and the sheet or document feeding mechanism of a microfilm recorder with which the endorsing apparatus is combined.

Referring to the drawing and instantly to Figure 1 which illustrates the document feeding mechanism of a microfilm recorder, a horizontal rotatable feed drum 1 receives sequentially fed sheets or documents, and rotatable pressure rollers 2 and 3 are yieldably urged into pressure engagement with the feed drum, and the sheets, as they are fed to the feed drum, are engaged between the feed drum and pressure rollers and are fed downwardly by the feed drum as it is rotated clockwise in Figure 1.

A pair of vertically spaced horizontal rotatable feed rollers 4 are arranged below the feed drum 1 in parallelism therewith and rotatable pressure rollers 5 are yieldably urged into pressure engagement respectively with the feed rollers 4. Sheets or documents sequentially fed downwardly from the feed drum 1 engage between the rollers 4 and 5 and are fed downwardly through a photographic field 6 between the pairs of rollers 4 and 5, this photographic field being that of the camera of the microfilm recorder, not shown.

A downwardly and forwardly inclined endless belt sheet conveyor, generally designated at 7, is arranged below the lower rollers 4 and 5, and receives the sequentially fed sheets from the lower rollers 4 and 5 and conveys them in a downwardly and forwardly direction for discharge into a receiving hopper 8 arranged below the lower forward end of the conveyor.

The conveyor 7 comprises upper and lower rotatable shafts 9 and 10 arranged in parallelism with the rollers 4, pulleys 11 respectively secured on these shafts, and endless conveyor belts 12 trained about the pulleys for conveying the documents along the upper stretches thereof, and also comprises rotatable hold down rollers 13 arranged above the upper stretches of the conveyor belts and the sheets conveyed thereby. The feed drum 1, the feed rollers 4, and the upper conveyor shaft 9 are driven in timed relation by gearing, generally designated at 14, the lower conveyor shaft 10 being driven from the upper conveyor shaft by the conveyor belts 12.

Both faces of sheets, as they are sequentially fed downwardly past the photographic field 6 by the sheet feeding mechanism above described, are photographed in a well known manner in a suitable camera, not shown, through the medium of opposing converging reflectors 15 arranged on opposite sides of the photographic field and illuminating lamps 16 which illuminate both faces of the sheets at the photographic field, and after they are photographed, the sheets are sequentially fed forwardly and downwardly on the conveyor 7 and are finally discharged into the receiving hopper 8.

The endorsing apparatus of my invention will now be described as combined with the microfilm recorder above described, for endorsing documents, such as bank checks, as an incident photographing the same in the recorder.

The sheet conveyor 7 is mounted on the frame 17 of the microfilm recorder and extends downwardly from this frame so that the conveyor shaft 10 at the lower discharge end of the conveyor is spaced below this frame. An endorser frame 18 is detachably secured on the recorder frame 17 by means of headed screws 19 and clamp bars 20 serving to clamp the endorser frame on the recorder frame with the endorser frame extending downwardly from the recorder frame into adjacent relation with the lower conveyor shaft 10. See Figures 1, 5 and 6. The frame 18 carries all of the endorsing apparatus with the exception of an ink reservoir 21, see Figure 3, which is detachably secured to a frame portion 22 of the microfilm recorder by screws 23, and a disengageable drive connection, hereinafter described, is provided between the lower conveyor shaft 10 of the recorder and the endorsing apparatus, so that the endorsing apparatus is quickly and easily installed on the recorder and removed therefrom.

Referring to Figures 1, 4, 5 and 6, parallel rotatable inking, printing and impression rollers, respectively designated at 24, 25 and 26 are carried on the endorser frame 18 and are arranged in a substantially vertical plane with the impression roller lowermost and the printing roller between the inking and impression rollers. The printing and impression rollers are positioned on the lower portion of the frame 18, so that when the frame is secured on the recorder frame, as above described, the printing and impression rollers are arranged in adjacent parallelism with the lower conveyor shaft 10 and with the bight between the printing and impression rollers arranged so that each sheet or document 27 being discharged from the conveyor, passes between the printing and impression rollers as an incident of its discharge into the hopper 8.

Figure 4:
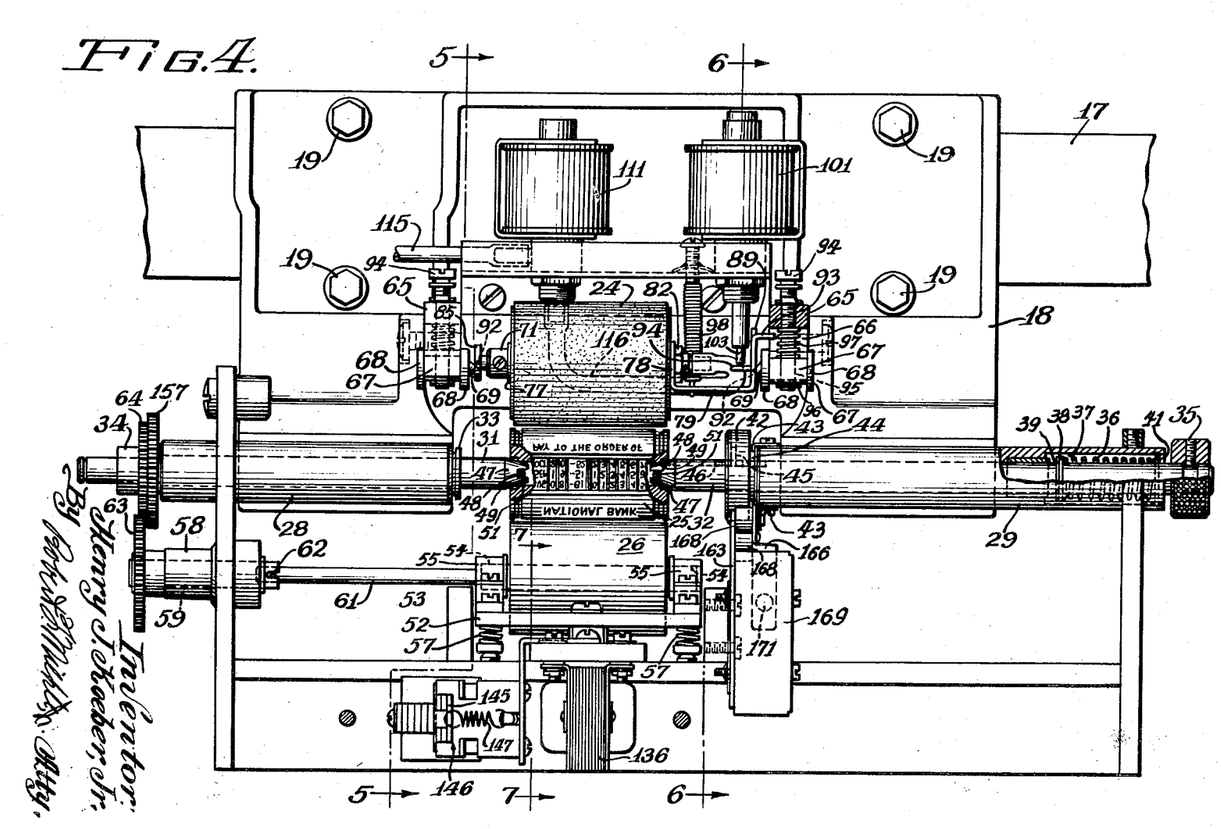
Figure 4 is a rear elevational view of the endorsing apparatus with parts broken away and shown in section.

The frame 18 is provided with spaced coaxial bored bearings 28 and 29, see particularly Figure 4, and spaced coaxial shafts 31 and 32 respectively extend through and are journaled for rotation in the bores of these bearings. The shaft 31 is held against axial movement by a thrust collar 33 secured on this shaft and engaging the inner end of the bearing 28 and a gear member 34 secured on this shaft and engaging the outer end of this bearing. The shaft 32 is axially slidable as well as rotatable within the bearing 29.

A collar 35, which serves as a manipulating knob, is secured on the outer end of the shaft 32 and is engageable against the outer end of the bearing 29 to limit inward movement of this shaft toward the shaft 31. A helical compression spring 36 surrounds the shaft 32 within an enlargement 37 of the outer portion of the bore of the bearing 29, and has its inner end engaged against a bearing collar 38 which in turn engages against a thrust collar 39 secured on this shaft and has its outer end engaged against a thrust collar 41 secured in the enlarged bore portion 37 adjacent its outer end, so that the shaft 32 is urged by the spring 36 toward the shaft 31 and to an inner position determined by engagement of the collar 35 against the outer end of the bearing 29. The shaft 32 may be manually moved outwardly away from the shaft 31 against the influence of the spring 36 by grasping the collar 35.

A bored roller 42 at the inner end of the bearing 29, is slidably engaged on the inner end portion of the shaft 32, and held against axial movement by thrust bearing clips 43 secured on the inner end of the bearing 29 and engaged in an annular bearing groove 44 on a reduced portion of the roller. The roller 42 is fixed for rotation with the shaft 32 by means of a key 45 fixed with the roller and slidably engaged in a longitudinal keyway 46 in the shaft 32 to permit axial movement of the shaft independently of the roller.

The opposing ends of the shafts 31 and 32 are tapered as designated at 47, and are provided with diametrical end slots 48. The ends of the printing roller 25 are provided with axial bores 49 into which the tapered ends 47 of the shafts 31 and 32 are engaged for the mounting of the printing cylinder on and between the inner ends of these shafts, and the ends of the printing roller are provided with clutch studs 51 which extend diametrically across these bores for engagement with the shaft slots 48 to provide drive connections between the printing roller and the shafts.

Figure 2:
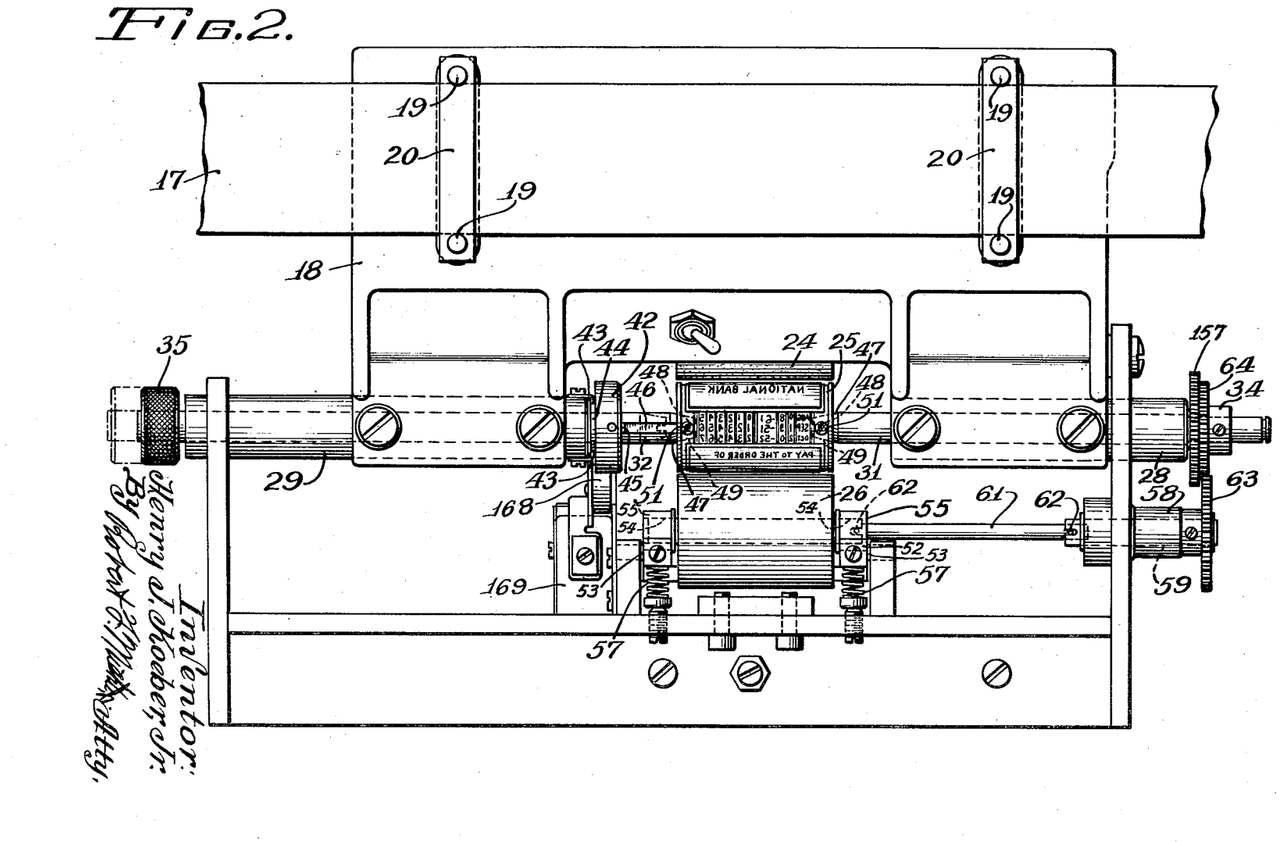
Figure 2 is a front elevational view of the endorsing apparatus.

The spring 36 serves to maintain the shaft 32 in its inner position, as shown, and thus maintains the shaft ends 47 engaged with the printing roller sockets 49 and the shaft slots 48 engaged with the printing roller clutch studs 51 for the mounting of the printing roller on and between the shafts 31 and 32, and movement of the shaft 32 outwardly against the influence of the spring 36 as shown in dot and dash lines in Figure 2 permits convenient removal of the printing roller and installation of the same, removal of the printing roller being desirable for various purposes such as cleaning, change of type or interchange. Engagement of the clutch studs 51 with the slots 48 form disengageable drive connections between the printing roller and shafts 31 and 32.

Figure 5:
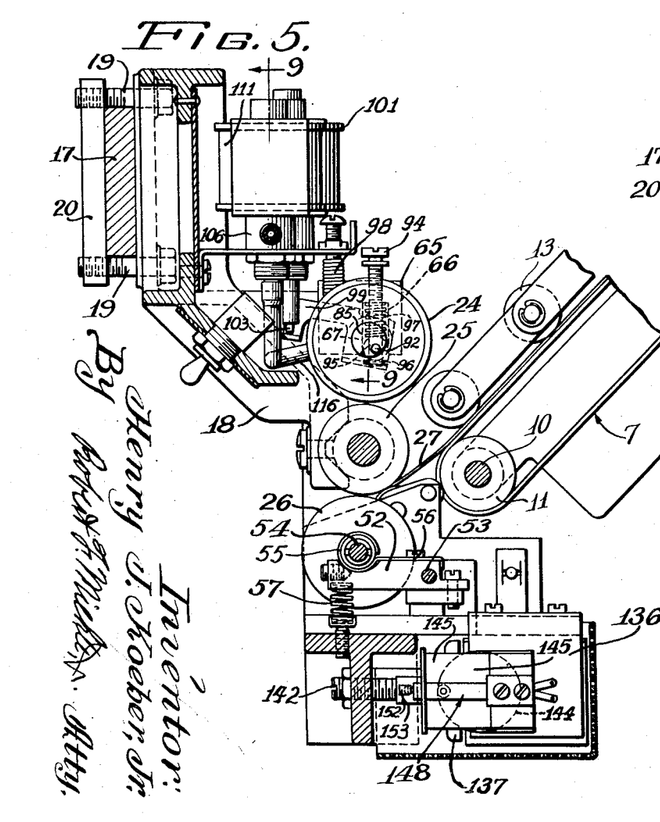
Figure 5 is a sectional view taken substantially on the line 5—5 of Figure 4.

A carrier 52 is pivotally mounted on the frame 18 on an axis parallel to the impression roller 26, as designated at 53, see Figures 2, 4 and 5, and the impression roller is rotatably mounted on this carrier in radially spaced relation with the pivotal axis of the carrier by means of shaft ends 54 of the impression roller being rotatably mounted in bearings 55 which are detachably mounted on the carrier as designated at 56 for removal and installation of the impression roller.

As so mounted on the carrier 52, the impression roller 26 is movable upwardly toward the printing roller 25 into impression relation therewith and downwardly away from the same out of impression relation therewith respectively with upward and downward movement of the carrier. Adjustable compression springs 57 react on the frame 18 and yieldably urge the carrier upwardly for exerting proper printing pressure on sheets or documents passing between the printing and impression rollers 25 and 26, downward movement of the carrier and with it the impression roller to a lower position serving to separate the impression roller from the printing roller for preventing the transfer of ink to the impression roller when documents are not passing between the rollers and for preventing printing on sheets passing between the rollers when such is not desired.

The frame 18 is provided with a bored bearing 58 arranged below and in parallelism with the bearing 28, and a short shaft 59 is rotatably mounted in this bearing. A shaft 61 extends between and has its ends connected with the shaft 59 and one of the impression roller shaft ends 54 by sliding universal joint drive connections, generally designated at 62, to provide a driving connection between the shaft 59 and the impression roller 26, which accommodates for the vertical movement of the impression roller. A gear 63 is secured on the outer end of the shaft 59 and meshes with a gear 64 on the gear member 34, so that the printing and impression rollers are rotated at the same peripheral velocity.

Bearing brackets 65 are secured on the frame 18 and are respectively spaced outwardly beyond opposite ends of the inking roller 24, and are provided with vertical slots 66. See Figures 4 and 5. Bearing members 67 are respectively engaged in the slots 66 for vertical movement and are provided with spaced flanges 68 which slidably engage opposite faces of the brackets to position the bearing members axially, and the opposing ends of the bearing members are provided with conical bearings 69, these bearing members being adjustably positioned vertically in the slots 66 by means hereinafter described.

Figure 9:
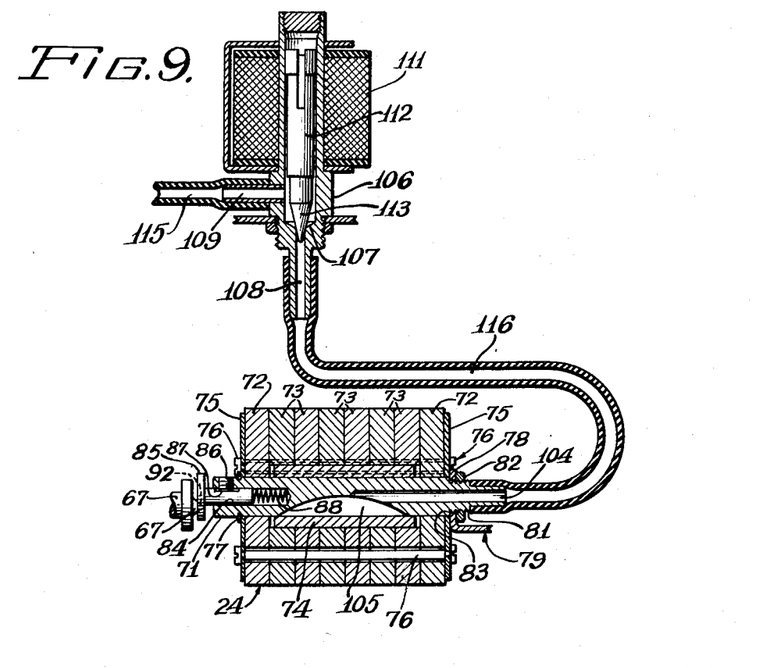
Figure 9 is a partial sectional view taken substantially on the line 9—9 of Figure 5.

Referring to Figure 9, the inking roller 24 is rotatably mounted on a shaft 71, and comprises a series of axially bored disks of absorbent material, such as felt, surrounding the shaft and forming a main portion and consisting of end disks 72 the bores of which are rotatably engaged on the shaft and intermediate disks 73 the bores of which are relatively large, a tubular member 74 of absorbent material, such as felt, rotatably engaged on the shaft between the end disks 72 and having its periphery engaged in the bores of the intermediate disks, axially bored non-absorbent rigid end disks 75 the bores of which are rotatably engaged on the shaft and which are respectively disposed at the outer faces of the end disks 72, and clamping and spacing devices, generally designated at 76, spaced about the axis of the inking roller and clamping the disks 72, 73 and 75 together and fixedly axially spacing the disks 75.

A collar 77, see Figures 4 and 9, is secured on the shaft 71 adjacent one end thereof and against which one of the disks 75 is axially engageable, and a bored portion 78 of a bearing bracket 79 is engaged on a reduced portion 81 of the shaft adjacent the other end thereof and is axially engageable by the other of the disks 75. A nut 82 is screwthreaded on the reduced shaft portion 81 and clamps the bearing bracket portion 78 between it and the shoulder 83 formed on the shaft by the reduced shaft portion 81, and so secures the bearing bracket on the shaft and axially confines the inking roller for rotation on the shaft between the collar 77 and the bearing bracket portion 78.

Referring to Figure 9, the shaft 71 is provided with a blind axial bore 84 extending inwardly from the end thereof opposite that at which the bearing bracket 79 is disposed, and an eccentric bearing stud 85 is slidably engaged in this bore. A set screw 86 is radially screw-threaded into the shaft 71 and is engaged in a flattened portion 87 on the stud 85, and serves to angularly fix the stud on the shaft and when tightened to axially fix the stud on the shaft, and when loosened slightly to permit a limited extent of axial movement of the stud relative to the shaft, and the stud is yieldably urged outwardly relative to the shaft by a compression spring 88 within the bore 84.

The bearing bracket 79 is of U-shape, see Figure 4, and the bored portion 78 forms one leg thereof, and the other leg 89 of the bearing bracket and the head of the bearing stud 85 are provided with oppositely facing conical bearing sockets 92 which are correspondingly radially displaced from the axis of the shaft 71 and inking roller 24 and are respectively pivotally engaged on the conical bearings 69 of the bearing members 67, so that pivotal movement of the shaft 71 on the bearing 69—92 effects vertical movement of the inking roller 24 into and out of inking relation with the printing roller 25 for the purpose of controlling the inking of the printing roller to prevent over inking thereof, it being noted that axial movement of the stud 85 with respect to the shaft 71, as provided by the set screw 86 and spring 88, provides for convenient installation and removal of the inking roller.

The leg 89 of the bearing bracket 79 is provided with a lateral stop lug 93 which projects into the vertical slot 66 of the adjacent bracket 65 and has play therein, and which by alternate engagement with the sides of this slot limits upward and downward movement of the inking roller. Each bearing member 67 is adjustably positioned vertically in the slot 66 of its bracket 65 for vertically adjusting the inking roller with respect to the printing roller, see Figure 5, by means of a vertical adjusting screw 94 screwthreaded downwardly through the bracket 65 and passing through an aperture 95 through the bearing member 67 and having a collar 96 secured thereon below the bearing member and engaging upwardly thereagainst and a compression spring 97 surrounding the screw between the bearing member and bracket and pressing the bearing member downwardly against the collar.

Figure 6:
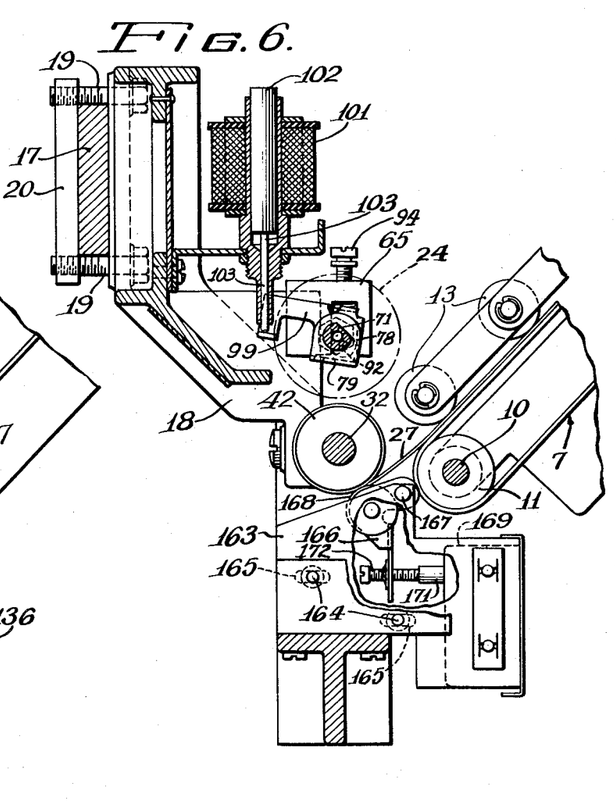
Figure 6 is a sectional view taken substantially on the line 6—6 of Figure 4.

An adjustable tension spring device 98 is connected between the frame 18 and the bearing bracket 79, and yieldably urges the inking roller 24 upwardly and normally maintains it in its upper position out of inking relation with the printing roller 25, as shown in Figures 4 and 5. The bearing bracket 79 is provided with a horizontally extending radial arm 99 as best shown in Figure 6, and a vertically arranged solenoid 101 is mounted on the frame 18 above the outer end of this arm and is provided with a vertically movable armature 102 having a downward extension 103 which bears downwardly on the outer end of the arm 99. When this solenoid is deenergized, the spring device 98 maintains the inking roller 24 in its upper position out of inking relation with the printing roller 25 and maintains the armature in an upper position, but upon energization of the solenoid, the armature is attracted downwardly and positions the inking roller in its lower position in inking relation with the printing roller.

Referring to Figure 9, the shaft 71 is provided with another blind axial bore 104 extending inwardly from the end thereof at which the bearing bracket 79 is disposed, and a radial slot 105 in the intermediate portion of this shaft communicates the bore 104 with the periphery of the shaft 71. The tubular member 74 and the disks 73 extend over the slot 105 for the feeding of ink to the tubular member 74 and the disks 72 and 73 and ink supplied thereto percolates therethrough for transfer to type on the printing roller 25 from the periphery of the inking roller 24.

A vertically arranged valve body 106 is mounted on the frame 18 and is provided with an upwardly facing valve seat 107 adjacent its lower end, with an outlet 108 below the valve seat, and with an inlet 109 a short distance above the valve seat. A vertically arranged solenoid 111 is mounted on and surrounds the upper portion of the valve body and is provided with an armature 112 which is mounted for vertical movement within the valve body above the valve seat and has a valve plug 113 at its lower end which together with the valve seat forms a valve, the valve plug closing the opening of the valve seat when the armature 112 is in its lower position into which it is yieldably urged and normally maintained by its weight. Energization of the solenoid 111 attracts the armature upwardly and opens the valve, and deenergization thereof closes the valve.

Figure 3:
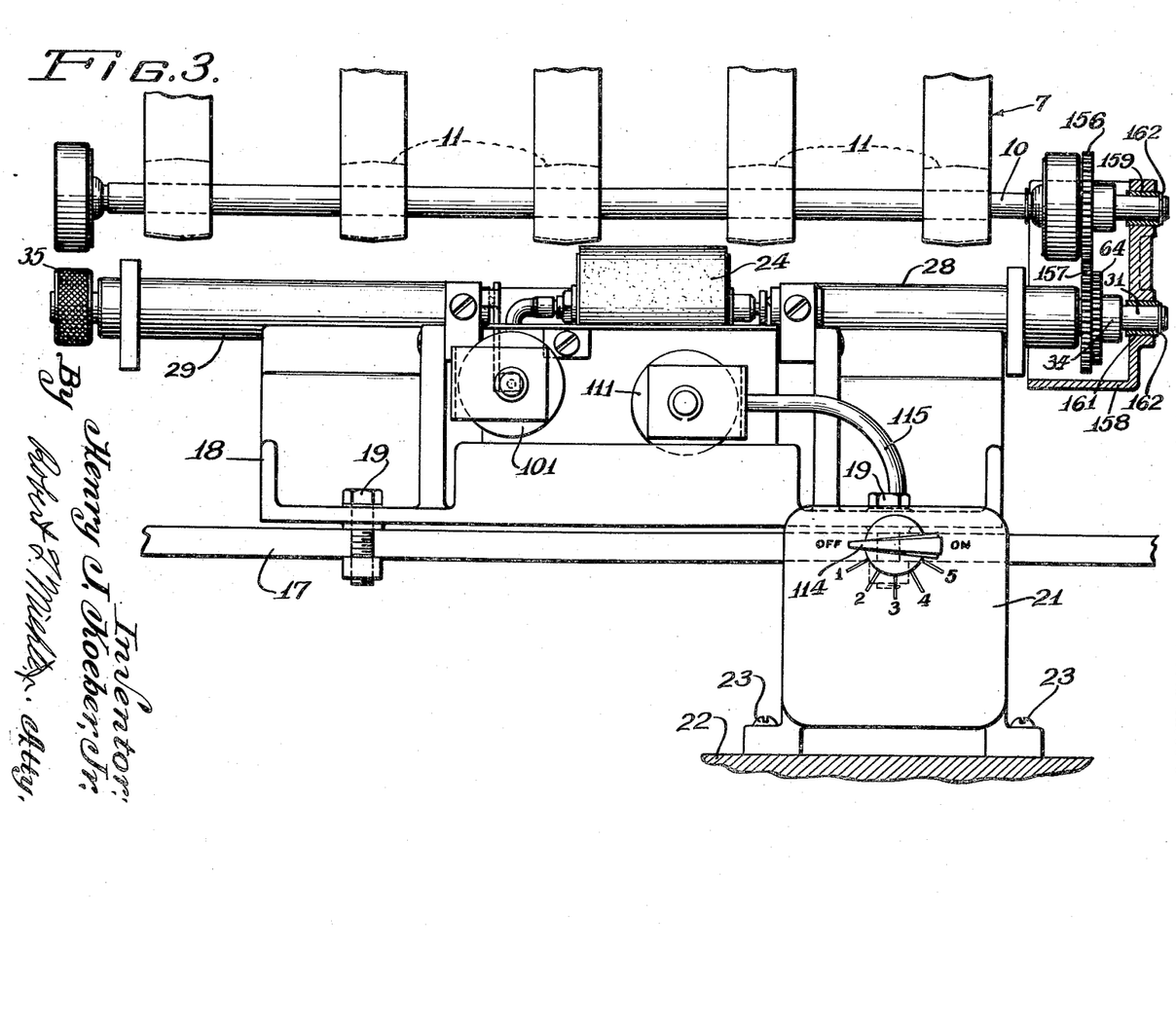
Figure 3 is a top plan view of the endorsing apparatus.

The ink reservoir 21, see Figure 3, is provided with a valve, not shown, for controlling the flow of ink from the reservoir, and a handle 114 on the exterior of the reservoir is connected to the inlet 109 of the valve body 106 by a flexible tube 115, see Figures 3 and 9, and the outlet 108 of the valve body is connected with the bore 104 of the shaft 71 by another flexible tube 116 for supplying ink from the reservoir to the inking roller 24 under control of the valve 107—113.

Figures 10, 11:
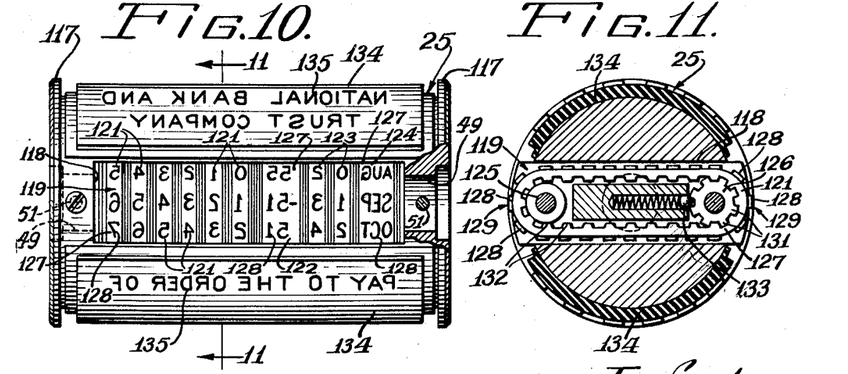
Figure 10 is a side elevational view of the printing or type roller of the apparatus.
Figure 11 is a sectional view taken substantially on the line 11—11 of Figure 10.

Referring to Figures 10 and 11, the printing roller 25 is provided with peripheral end flanges 117 defining the printing radius of the roller and with an axially elongated rectangular diametrical opening 118 therethrough which is inwardly spaced from both ends of the roller, and a selective numbering and dating type assembly, generally designated at 119, is mounted within this opening, and comprises a series of changeable numbering devices 121 and dating devices 122, 123 and 124.

Each numbering or dating device comprises a pair of spaced rotatable rollers 125 and 126 arranged in axial parallelism with the printing roller and disposed respectively adjacent the opposite open sides of the opening 118, and an endless flexible type belt 127 of rubber or other suitable material is trained over these rollers for lineal movement. Each belt is provided on its exterior surface with a sequence of projecting type characters 128 equally spaced linearly of the belt and comprising two identical correspondingly arranged series of type characters providing for the selective positioning of identical type characters in printing positions at diametrically opposite sides of the periphery of the printing roller, as designated at 129 in Figure 11, for printing from selected identical type characters.

The peripheries of the rollers 126 are provided with teeth 131 and the inner surfaces of the type belts 127 are provided with teeth 132 which engage the roller teeth 131 to angularly fix the belts and rollers 126, and the assembly 119 is provided with releasable spring detent devices 133 which are respectively engageable with the teeth of the rollers 126 to releasably maintain the type belts in selected positions, so that selected type characters may be brought into printing position by manually moving the type belts.

As shown in Figure 10, the type of the type belts of the numbering devices 121 are single numbers and cooperate to provide index reference numbers, and of the dating devices, the type on the belt of the dating device 122 are pairs of numbers to indicate the year, the type on the belts of the two dating devices 123 are single numbers and cooperate to indicate the day of the month, and the type on the belt of the dating device 124 are abbreviations of the months of the year to indicate the month.

Two printing plates 134 are secured in diametrically opposite relation on the periphery of the printing roller between the flanges 117 and the open sides of the opening 118, and the exterior surfaces of these plates are provided with identical type matter 135 which together with the type of the numbering and dating devices 121, 122, 123 and 124, which are in printing position, are printed on sheets or documents as they pass between the printing and impression rollers when the printing and impression rollers are in impression relation.

As shown, the type matter 135 of the printing plates 134 each constitute check endorsements which are supplemented by the type of the numbering and dating devices, for endorsing bank checks, and the purpose of the two endorsements on the printing roller is to insure one complete endorsement on each bank check, though the endorsement may be possibly in two parts, it being observed that bank checks are frequently quite narrow.

Recalling, see Figures 5, 7 and 8, that the impression roller 26 is mounted on the pivotally mounted carrier 52 for vertical movement upwardly under the influence of the springs 57 into impression relation with the printing roller 25 and downwardly against the influence of these springs out of impression relation with the printing roller, downward movement of the impression roller is effected in the following manner.

A horizontally arranged electromagnet 136 is secured on the frame 18 below the carrier 52, see particularly Figures 7 and 8, and the armature 137 of the electromagnet is secured to a carrier 138 slidably mounted on the electromagnet. The carrier 138 is pivotally connected, as designated at 139, to the lower end of an arm 141 which is secured to and extends downwardly from the carrier 52, so that upon energization of the electromagnet, the armature 137 is attracted toward the electromagnet and actuates the carrier 52 against the influence of the springs 57 and moves the impression roller 26 downwardly against the influence of the springs 57 and out of impression relation with the printing roller 25, de-energization of the electromagnet permitting the springs 57 to position the impression roller in impression relation with the printing roller.

An adjustable stop screw 142 is screwthreaded horizontally through a portion of the frame 18 in alinement with the lower end of the arm 141 and is secured in adjusted position by a lock nut 143, and the lower end of the arm 141 is engageable with the opposing end of the stop screw to limit movement of the impression roller 26 under the influence of the springs 57 upwardly toward the printing roller 25 to adjustably position the impression roller in proper impression relation with the printing roller.

Figure 8:
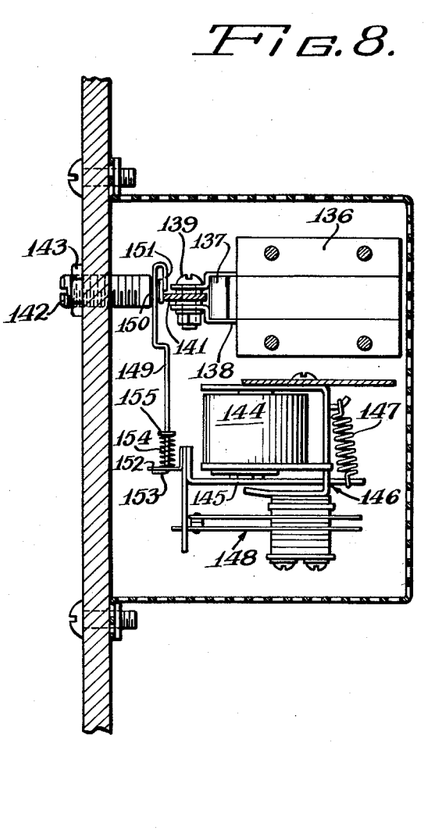
Figure 8 is a partial sectional view taken substantially on the line 8—8 of Figure 7.

An electromagnetic relay, see particularly Figure 8, comprises an electromagnet 144 arranged adjacent and transversely of the electromagnet 136, an armature 145 pivoted at 146 and under the control of the electromagnet and yieldably urged in opposition to the influence of this electromagnet by a spring 147, and a switch 148 actuated into closed and open positions respectively with energization and de-energization of the electromagnet 144.

One end of a latch member 149 is slidably mounted in a circumferential groove 150 on the end portion of the stop screw 142 adjacent the arm 141 and is provided at this end with a return latch portion 151 which is engageable over this end of the stop screw and is movable with the latch member 149 into and out of position between the stop screw and the arm 141 to retain the impression roller 25 out of impression relation with the printing roller 24 though the electromagnet 136 is de-energized, it being noted that in order for the latch portion 151 to engage between the stop screw 142 and the arm 141, it is necessary that the arm be positioned away from the stop screw by energization of the electromagnet 136.

The other end portion of the latch member 149 extends through and is slidable in an apertured lug 152 secured with the armature 145, and is bent at a right angle, as designated at 153, into abutting relation with the lug so that movement of the armature 145 away from the electromagnet 144 under the influence of the spring 147, namely, in the direction to open the switch 148, moves the latch portion 151 into position between the stop screw 142 and the arm 141. The bent end 153 of the latch member 149 is yieldably urged into and normally maintained in engagement with the lug 152 by a compression spring 154 encircling the latch member 149 and engaged between the stop lug and a collar 155 secured on the latch member, so that the latch portion 151 is yieldably moved out of engagement between the stop screw 142 and arm 141 as the armature 145 is moved toward the electromagnet 144 when the electromagnet 144 is energized, namely, in the direction to close the switch 148, it being observed that if the latch portion 151 is clamped between the stop screw 142 and the arm 141, the spring 154 compresses so that movement of the armature 145 toward the electromagnet 144 is not interfered with.

Referring to Figures 1 and 3, a gear 156 is secured on the lower conveyor shaft 10 adjacent one end thereof and meshes with a gear 157 on the gear member 34 which is secured on the printing roller shaft 31, so that the printing and impression rollers 25 and 26 are driven with the sheet feeding and conveyor mechanism of the microfilm recorder to feed sheets therebetween as the sheets are sequentially fed thereto from the conveyor 7 and to discharge the sheets into the hopper 8, the printing roller printing upon the sheets as they pass between the printing and impression rollers provided that the impression roller is in its upper position in impression relation with the printing roller. It will be observed that the gears 156 and 157 provide a disengageable drive connection between the lower conveyor shaft 10 and the printing roller 25, which provides for convenient installation and removal of the endorsing apparatus.

A combined gear cover and bearing member 158 is provided with parallel bored bearings 159 and 161 in which the end portions of the lower conveyor and the printing roller shafts 10 and 31, which project outwardly from the gear 156 and gear member 34, are respectively engaged for rotation, and collars 162 are releasably secured on these shafts outwardly of the gear cover and bearing member to retain the gear cover and bearing member in place with the shafts engaged in the bearings, it being observed that the gear cover and bearing member rigidly spaces these shafts adjacent the gears 156 and 157 and so maintains them in proper mesh, and that the mounting of the gear cover and bearing member promotes convenient installation and removal of the endorsing apparatus.

Referring to Figures 4 and 6, a support plate 163 is disposed transversely of the axis of the shaft 32 and below the same, and is secured on the frame 18 by means of headed screws 164 passing through horizontal slots 165 in the plate and screw-threaded into the frame, so that the plate is horizontally adjustable with respect to this shaft and the roller 42. An arm 166 is pivotally mounted, as designated at 167, upwardly on the support plate 163, and a roller 168 is rotatably mounted on the arm in spaced relation with the pivot 167 and in axial parallelism with the roller 42 and is engageable upwardly thereagainst. A double throw microswitch 169 is secured on the support plate 163 and has its outwardly spring urged actuating plunger 171 directed toward the lower end of the arm 166, and an adjusting screw 172 is screw-threaded through the lower end of the arm 166 in alinement and engaged with the switch plunger 171 so that normally the plunger is in position closing one side of the switch and positioning the roller 168 in slight pressure engagement with the roller 42, the engagement of the rollers 168 and 42 being a short distance in advance of the printing location between the printing and impression rollers 25 and 26 in the direction opposite that of the feed of documents, so that documents as they are fed from the conveyor 7 first pass between the rollers 168 and 42 and then between the printing and impression rollers.

Figure 7:
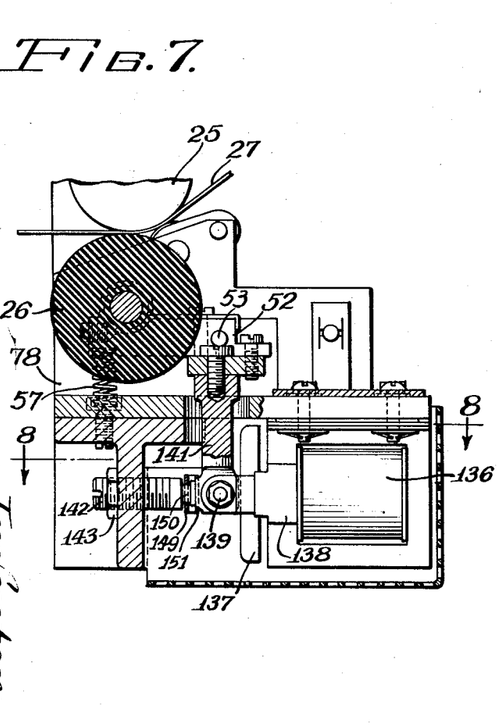
Figure 7 is a partial sectional view taken substantially on line 7—7 of Figure 4.

As a sheet 27 is fed from the conveyor 7, as shown in Figures 5 and 6, the sheet passes between the rollers 168 and 42 and displaces the roller 168 away from the roller 42, as shown in Figure 7, and actuates the switch plunger 171 to open the normally closed side and to close the other normally open side of the switch 169, and maintains the switch in this condition until the document passes from between these rollers, after which the roller 168 returns to its normal position and the switch returns to its normal condition.

The microfilm recorder is provided as usual with a sheet or document counter switch device which comprises as follows:

Referring to Figure 1, a pivotally mounted rock shaft 174 is arranged in parallelism with and adjacent the feed drum 1, and a sheet contact finger 175 is secured on the rock shaft for movement into and out of the path of sheets as they are fed about the feed drum. The rock shaft is yieldably urged in the direction to position the sheet contact finger across the document path, and an arm 176 is fixed on the rock shaft and engages a stationary stop 177 to limit movement of the rock shaft in its yieldably urged direction and to normally position the rock shaft with the sheet contacting finger positioned across the sheet path.

Another arm 178 is fixed on the rock shaft 174, and an adjustment screw 179 is adjustably screwthreaded through the other end of this arm and is secured in adjusted position on the arm by a lock nut 180. This adjustment screw alines with the actuating plunger 181 of a normally open microswitch 182 for closing the switch when the sheet contact finger 175 is moved out of the sheet path by a sheet as it is fed about the feed drum 1, the contact finger returning to its position across the sheet path and thus opening the switch when the sheet passes beyond the contact finger, it being observed that sheets, as they are sequentially fed by the sheet feeding mechanism, encounter the sheet contact finger 175 and close the microswitch 182 in advance of their passing between the rollers 42 and 168 and actuating the double throw switch 169 to open the normally closed side thereof and close the normally open side thereof just previous to the documents passing between the printing and impression rollers 25 and 26.

Figure 12:
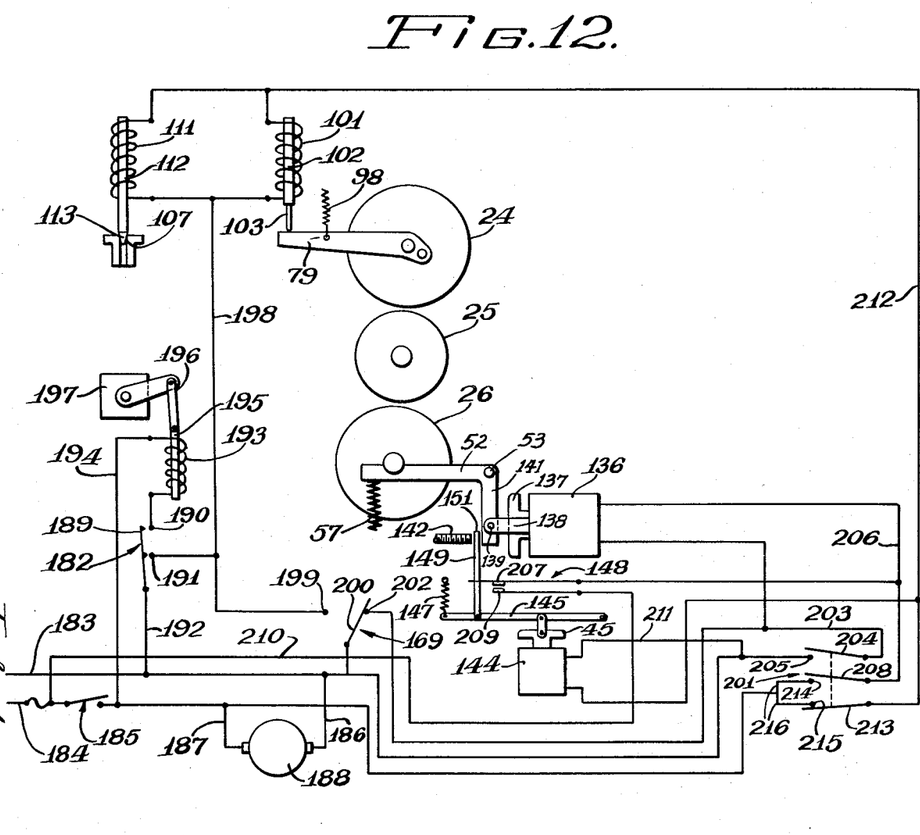
Figure 12 is a diagrammatic view showing the electrical circuiting of the apparatus.

Referring to Figure 12, line conductors 183 and 184 are supplied from a suitable electrical current source, and the line conductor 184 is inclusive of a main switch 185. Conductors 186 and 187 are respectively connected with the line conductors 184 and 185 and serve as supply conductors to the electrical devices of the microfilm recorder including a drive motor 188 which drives in a usual manner, not shown, the sheet feeding mechanism of the recorder comprising the feed drum 1, the rollers 4 and the conveyor 7, and which through the conveyor, drives the printing and impression rollers 25 and 26 of the endorsing apparatus as hereinabove described, the conductor 187 being connected with the line conductor 184 under the control of the main switch 185 so that this switch controls the motor and consequently the drive of the sheet feeding mechanism and of the printing and impression rollers.

The sheet controlled switch 182 is preferably in the form of a double contact switch comprising a switch arm 189 simultaneously contacting and disengaging from two contacts 190 and 191. The switch arm 189 is connected by a conductor 192 with the line conductor 183, and the contact 190 is connected to one terminal of a usual sheet counter solenoid 193 of the microfilm recorder. The other terminal of this solenoid is connected by a conductor 194 with the line conductor 184 under the control of the main switch 185, so that as sequentially fed sheets pass the sheet contacting finger 175, the solenoid 193 is energized and deenergized as each sheet engages and disengages from the sheet contacting finger. A yieldably urged armature 195, under the control of this solenoid, is connected as indicated at 196 to a usual counter 197 to count the sheets fed by the sheet feeding mechanism.

The other contact 191 of the switch 182 is connected by a branch conductor 198 with one terminal of each of the ink and inking roller solenoids 111 and 101, and with the normally open side contact 199 of the sheet controlled double throw switch 169, and the switch arm 200 of the latter switch is connected with the line conductor 183. A triple pole switch 201 serves for rendering the endorsing apparatus operative or inoperative for endorsing sheets, and the other normally closed side contact 202 of the switch 169 is connected by a branch conductor 203 with one terminal of the electromagnet 136 and with one switch arm 204 of the switch 201, and the contact 205 of this switch corresponding with this switch arm is connected with the line conductor 183.

The other terminal of the electromagnet 136 is connected by a branch conductor 206 with the switch arm 207 of the relay switch 148 and with a second switch arm 208 of the switch 201, and the contact 209 of the relay switch 148 is connected by a conductor 210 with the line conductor 184 in advance of and so not under the control of the main switch 185.

One terminal of the relay electromagnet 144 is connected with the line conductor 183 by a conductor 211, and the other terminals of the ink and inking roller solenoids 111 and 101 and of the relay electromagnet 144 are connected by a branch conductor 212 to the third switch arm 213 of the switch 201. The contacts 214 and 215 of the switch 201 which correspond respectively with the switch arms 208 and 213 are connected with the line conductor 184 under the control of the main switch 185, by conductors 216.

The arrangement of the switch 201 is such that in one position of the switch arms thereof, as shown in Figure 12, the switch arms 204 and 208 are disengaged from their contacts 205 and 214 and the switch arm 213 contacts its contact 215, and that in the other position of the switch arms the switch arms 204 and 208 contact their contacts 205 and 214 and the switch arm 213 is disengaged from its contact 215, the first mentioned position of these switch arms rendering the endorsing apparatus operative to endorse sheets as they pass between the printing and impression rollers 25 and 26, and the second mentioned position of these switch arms rendering the endorsing apparatus inoperative to endorse sheets.

Assuming the line conductors 183 and 184 to be connected with a suitable current source and the main switch 185 to be closed, the sheet feeding mechanism and the printing and impression rollers 25 and 26 are driven by the motor 188. With the switch 201 in its endorsing position, as shown in Figure 12, in the absence of fed sheets actuating the switches 169 and 182 out of their normal positions, as shown, contact of the switch arm 213 of the switch 201 with the contact 215 energizes the relay electromagnet 144, and connects the ink and inking roller solenoids 111 and 101 with the line conductor 184 for energizing these solenoids by actuation of either of the switches 169 and 182 out of their normal positions by sheets fed by the sheet feeding mechanism, it being observed that each of the switches 169 and 182 through their contacts 199 and 191, the switch 201 through its switch arm 213 and contact 215, and each of the ink and inking roller solenoids are connected in series.

The electromagnet 144 being thus energized, the switch 148 is closed and connects the electromagnet 136 with the line conductor 184, and in the absence of a fed sheet actuating the switch arm 200 of the switch 169 out of its normal position contacting the contact 202, closure of the switch 148 energizes the electromagnet 136, it being observed that the switch 148, the switch 169 through its contact 202 and the electromagnet 136 are connected in series. Energization of the electromagnet 136 positions the impression roller 26 away from the printing roller 25 against the influence of the springs 57 and maintains it out of its impression relation with the printing roller as long as this electromagnet is energized. Meantime, the latch portion 151 of the latch member 149 is withdrawn from between the stop screw 142 and the arm 141 of the impression roller carrier 52 by energization of the electromagnet 144, and is maintained in this position to permit movement of the impresson roller into impression relation with the printing roller as long as this electromagnet is energized, the purpose of the latch member being to prevent the impression roller from being positioned in impression relation with the printing roller when the electromagnet 144 is not energized and this impression relation is not desired, as when the main switch 185 is open or when the switch 201 is in non endorsing position.

With the circuiting in condition for endorsing as above described, a sheet fed by the sheet feeding mechanism, first actuates the sheet contact finger 175 out of its normal position and temporarily closes the sheet controlled switch 182, and as a result, the counter solenoid 193 is temporarily energized through the contact 190 of this switch to count the sheet, both the ink and inking roller solenoids 111 and 101 are temporarily energized through the contact 191 to respectively feed a metered quantity of ink to the inking roller 24 and to temporarily contact the inking roller with the printing roller for inking the latter.

A short interval after the fed sheet passes out of controlling relation with the switch 182 and this switch is again opened, the sheet passes between the rollers 42 and 168 immediately before and in overlapping relation with its passage between the inking rollers 25 and 26, and temporarily actuates the switch 169 out of its normal position in which the switch arm 200 contacts the contact 202, into its opposite position in which the switch arm contacts the contact 199. As a result, the electromagnet 136 is temporarily deenergized by disengagement of the switch arm 200 from the contact 202 and the springs 57 temporarily actuate the impression roller into impression relation with the printing roller for endorsing the sheet passing therebetween, and the ink and inking roller solenoids are temporarily energized to again respectively feed a metered quantity of ink to the inking roller and to contact the inking roller with the printing roller for inking the latter. After the fed sheet passes from between the rollers 42 and 168 the switch 169 returns to its normal position, whereupon the ink and inking roller solenoids are deenergized and the inking roller moves out of contact with the printing roller, and the electromagnet 136 is energized and actuates the impression roller out of impression realtion with the printing roller preparatory to another endorsing operation.

The two energizations of the ink and inking roller solenoids per fed sheet provides an adequate amount of ink to the inking roller and adequate contact between the inking roller and the printing roller for properly inking the latter, particularly in the case of endorsing narrow sheets such as bank checks, it being observed that where narrow sheets are fed in closely spaced sequence a number of them will be disposed between the sheet contact finger 175 and the rollers 42 and 168. By reason of the sheet controlled switch 182 being a double contact switch controlling the counter solenoid 193 through one contact 190 thereof and separately controlling the ink and inking roller solenoids 111 and 101 through the other contact 191 thereof in shunt with the contact 199 of the sheet controlled switch 169, the contact of the switch arm 200 of this sheet controlled switch with the contact 199 cannot energize the counter solenoid 193 and so cannot interfere with counting of the fed sheets. The reason that the contact 209 of the relay switch 148 is connected by the conductor 210 with the line conductor 185 in advance of and so not under the control of the main switch 185, is to assure, when the main switch is opened, that the electromagnet 136 is not deenergized so early as to prevent the latch portion 151 of the latch member 149 from engaging between the stop screw 142 and the arm 141 of the impression roller carrier 52 to prevent the impression roller from moving into impression relation with the printing roller.

When the switch 201 is in its non-endorsing position with the switch arms 204 and 208 respectively contacting their contacts 205 and 214 and with the switch arm 213 disengaged from its contact 215, the sheet controlled switches 169 and 182 are rendered ineffective to energize the ink and inking roller solenoids 111 and 101 and the impression cylinder 26 is maintained out of impression relation with the printing cylinder, so that sheets may be fed by the sheet feeding mechanism for photographing the same by the microfilm recorder and fed between the printing and impression rollers of the endorsing apparatus without being endorsed. This is accomplished in the following manner.

Disengagement of the switch arm 213 of the switch 201 with its contact 215 opens the circuit of the ink and inking roller solenoids 111 and 101, so that the sheet controlled switches 169 and 182 cannot energize and deenergize the ink and inking roller solenoids through their contacts 199 and 191, though the switch 182 continues to energize and deenergize the counter solenoid 193 for counting the fed sheets. Disengagement of the switch arm 213 from its contact 215 also deenergizes the relay electromagnet 144, the relay switch 148 being thus open and the latch portion 151 of the latch member 149 being disposed between the stop screw 142 and the arm 141 of the impression roller carrier 52. Contact of the switch arm 208 of the switch 201 with its contact 214 which are in shunt with the switch 148, renders the switch 148 ineffective to control the energization of the impression roller electromagnet 136. Contact of the switch arm 204 of the switch 201 with its contact 205 which are in shunt with the contact 202 of the switch 169, renders the switch 169 ineffective to control energization of the impression roller electromagnet 136, and energizes this electromagnet to maintain the impression roller out of impression relation with the printing roller independently of the latch portion of the latch member 149 to provide additional assurance that the impression roller is maintained out of impression relation with the printing roller and to separate these rollers a greater extent than is provided by the latch portion 151 with a view toward minimizing the transfer of ink to the sheets.

While I have thus described my invention, I do not wish to be limited to the precise details described, as changes may be readily made without departing from the spirit of my invention, but having thus described my invention, I claim as new and desire to secure by Letters Patent the following:

1. In apparatus of the character described, the combination of printing and impression rollers, sheet feeding means for sequentially feeding sheets to said rollers, means for positioning said rollers in and out of impression relation comprising electromagnetic means effecting said impression relation when deenergized, a switch connected in controlling relation with said electromagnetic means and under the control of a sheet fed by said feeding means for deenergizing said electromagnetic means during passage of said sheet between said rollers and while under said control, latch means for retaining said rollers out of impression relation and adapted to be rendered inoperative, electromagnetic means connected with said latch means for rendering said latch means inoperative when said second mentioned electromagnetic means is energized, a switch connected in controlling relation with said second mentioned electromagnetic means, and circuit connections for energizing said first mentioned electromagnetic means through said first mentioned switch and said second mentioned electromagnetic means through said second mentioned switch.

2. In apparatus of the character described, the combination of claim 1 and further comprising an electric motor connected with said feeding means and at least one of said rollers for driving the same, and circuit connections for energizing said motor through said second mentioned switch.

3. In apparatus of the character described, the combination of printing and impression rollers, sheet feeding means for sequentially feeding sheets to said rollers, means for positioning said rollers in and out of impression relation comprising electromagnetic means effecting said impression relation when deenergized, a switch connected in controlling relation with said electromagnetic means and under the control of a sheet fed by said feeding means for deenergizing said electromagnetic means during passage of said sheet between said rollers and while under said control, latch means for retaining said rollers out of impression relation and adapted to be rendered inoperative, a switch connected in controlling relation with said electromagnetic means in series relation with said first mentioned switch, electromagnetic means connected with said latch means and second mentioned switch for rendering said latch means inoperative and closing said second mentioned switch when said second mentioned electromagnetic means is energized, a switch connected in controlling relation with said second mentioned electromagnetic means, and circuit connections for energizing said first mentioned electromagnetic means through said first and second mentioned switches and said second mentioned electromagnetic means through said third mentioned switch.

4. In apparatus of the character described, the combination of claim 3 and further comprising an electric motor connected with said feeding means and at least one of said rollers for driving the same, and circuit connections for energizing said motor through said third mentioned switch.

5. In apparatus of the character described, the combination of printing and impression rollers, sheet feeding means for sequentially feeding sheets to said rollers, means for positioning said rollers in and out of impression relation comprising electromagnetic means effecting said impression relation when deenergized, a switch connected in controlling relation with said electromagnetic means and under the control of a sheet fed by said feeding means for deenergizing said electromagnetic means during passage of said sheet between said rollers and while under said control, latch means for retaining said rollers out of impression relation and adapted to be rendered inoperative, a switch connected in controlling relation with said electromagnetic means in series relation with said first mentioned switch, electromagnetic means connected with said latch means and second mentioned switch for rendering said latch means inoperative and closing said second mentioned switch when said second mentioned electromagnetic means is energized, a switch connected in controlling relation with said second mentioned electromagnetic means, a switch connected in controlling relation with said first mentioned electromagnetic means and in shunt with said first mentioned switch, and circuit connections for energizing said first mentioned electromagnetic means through said first or fourth and second mentioned switches and said second mentioned electromagnetic means through said third mentioned switch.

6. In apparatus of the character described, the combination of printing, impression and inking rollers, sheet feeding means for sequentially feeding sheets to said printing and impression rollers, means for positioning said printing and impression rollers in and out of impression relation comprising electromagnetic means effecting said impression relation when deenergized, means for positioning said printing and inking rollers in and out of inking relation comprising electromagnetic means effecting said inking relation when energized, a double throw switch having its side contacts respectively connected in controlling relation with said two electromagnetic means and under the control of a sheet fed by said feeding means for positioning said rollers in said impression and inking relations during the passage of said sheet between said printing and impression rollers and while under said control, latch means for retaining said printing and impression rollers out of impression relation and adapted to be rendered inoperative, a switch connected in controlling relation with said first mentioned electromagnetic means in series relation with said double throw switch, electromagnetic means connected with said latch means and second mentioned switch for rendering said latch means inoperative and closing said second mentioned switch when said third mentioned electromagnetic means is energized, a switch connected in controlling relation with said third mentioned electromagnetic means, a double pole switch arranged to alternately close its poles and having one pole thereof connected in controlling relation with said first mentioned electromagnetic means in shunt relation with said first mentioned switch and having the other pole thereof connected in controlling relation with said second mentioned electromagnetic means in series relation with said first and third mentioned switches, and circuit connections for energizing said first mentioned electromagnetic means through said first or fourth and second mentioned switches, said second mentioned electromagnetic means through said first, third and fourth mentioned switches, and said third mentioned electromagnetic means through said third mentioned switch.

7. In apparatus of the character described, the combination of claim 6 and further comprising an electric motor connected with said feeding means and at least one of said printing and impression rollers for driving the same, and circuit connections for energizing said motor through said third mentioned switch.

8. In apparatus of the character described, the combination of printing, impression and inking rollers, sheet feeding means for sequentially feeding sheets to said printing and impression rollers, means for positioning said printing and impression rollers in and out of impression relation comprising electromagnetic means effecting said impression relation when deenergized, means for positioning said printing and inking rollers in and out of inking relation comprising electromagnetic means effecting said inking relation when energized, a double throw switch having its side contacts respectively connected in controlling relation with said two electromagnetic means and under the control of a sheet fed by said feeding means for positioning said rollers in said impression and inking relation during the passage of said sheet between said printing and impression rollers and while under said control, latch means for retaining said printing and impression rollers out of impression relation and adapted to be rendered inoperative, a switch connected in controlling relation with said first mentioned electromagnetic means in series relation with said double throw switch, electromagnetic means connected with said latch means and second mentioned switch for rendering said latch means inoperative and closing said second mentioned switch when said third mentioned electromagnetic means is energized, a switch connected in controlling relation with said third mentioned electromagnetic means, a triple pole switch arranged to alternately close one pole and the other two poles thereof and having said one pole thereof connected in controlling relation with said second mentioned electromagnetic means in series relation with said first and third mentioned switches and with said third mentioned electromagnetic means in series relation with said third mentioned switch and having one of said other two poles thereof connected in controlling relation with said first mentioned electromagnetic means in shunt relation with said first mentioned switch and having the other of said two poles thereof connected with said first mentioned electromagnetic means in series relation with said first and third mentioned switches and in shunt relation with said second mentioned switch, and circuit connections for energizing said first mentioned electromagnetic means through said first and second or said third and fourth mentioned switches, said second mentioned electromagnetic means through said first, third and fourth mentioned switches, and said third mentioned electromagnetic means through said third and fourth mentioned switches.

References Cited in the file of this patent

UNITED STATES PATENTS

| | | |
|---|---|---|
| 969,061 | Johnson | Aug. 30, 1910 |
| 1,329,325 | Mascord | Jan. 27, 1920 |
| 1,475,687 | Cobb | Nov. 27, 1923 |
| 1,758,536 | Post | May 13, 1930 |
| 1,955,814 | Kranz | Apr. 24, 1934 |
| 2,019,897 | Fiehl | Nov. 5, 1935 |
| 2,319,616 | Luehrs | May 18, 1943 |
| 2,323,673 | Nyberg | July 6, 1943 |
| 2,432,133 | Babics | Dec. 9, 1947 |
| 2,537,851 | Pannier | Jan. 9, 1951 |
| 2,605,701 | Huebner | Aug. 5, 1952 |
| 2,660,113 | Gullixson | Nov. 25, 1953 |
| 2,667,831 | Streich | Feb. 2, 1954 |